(12) United States Patent
Thalhauser et al.

(10) Patent No.: US 10,837,351 B2
(45) Date of Patent: Nov. 17, 2020

(54) METHOD FOR REGULATING AN INTERNAL COMBUSTION ENGINE

(71) Applicant: INNIO Jenbacher GmbH & Co OG, Jenbach (AT)

(72) Inventors: Josef Thalhauser, Nuborf (DE); Nikolaus Spyra, Innsbruck (DE); Ettore Musu, Garching b. Munchen (DE)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 15/738,173

(22) PCT Filed: Jun. 24, 2016

(86) PCT No.: PCT/AT2016/050232
§ 371 (c)(1),
(2) Date: May 8, 2018

(87) PCT Pub. No.: WO2017/000011
PCT Pub. Date: Jan. 5, 2017

(65) Prior Publication Data
US 2018/0252150 A1    Sep. 6, 2018

(30) Foreign Application Priority Data

Jun. 30, 2015 (AT) .................... 416/2015

(51) Int. Cl.
*F02B 19/10* (2006.01)
*F02D 13/02* (2006.01)
(Continued)

(52) U.S. Cl.
CPC ...... *F02B 19/1052* (2013.01); *F02B 19/1085* (2013.01); *F02B 43/12* (2013.01);
(Continued)

(58) Field of Classification Search
CPC .......... F02D 13/02–0265; F02D 19/02; F02D 19/024; F02D 19/0647; F02D 19/10;
(Continued)

(56) References Cited

U.S. PATENT DOCUMENTS 4,175,522 A    11/1979  Kawamura et al.
4,192,265 A    3/1980   Amano et al.
(Continued)

FOREIGN PATENT DOCUMENTS

CN    1982668 A       6/2007
DE    28 02 279 A1    7/1978
(Continued)

OTHER PUBLICATIONS

Office Action issued in connection with corresponding AT Application No. A 416/2015 dated Jun. 17, 2016.
(Continued)

*Primary Examiner* — John M Zaleskas
(74) *Attorney, Agent, or Firm* — Fletcher Yoder, P.C.

(57) ABSTRACT

A method for controlling an internal combustion engine whereby, in a piston-cylinder unit provided with a prechamber, the quantity of propellant gas supplied to the prechamber is adjusted to regulate the operating characteristics of an inlet and/or outlet valve of the piston-cylinder unit.

20 Claims, 3 Drawing Sheets

(51) Int. Cl.
| | | |
|---|---|---|
| F02B 43/12 | (2006.01) | |
| F02D 41/00 | (2006.01) | |
| F02D 19/06 | (2006.01) | |
| F02D 19/02 | (2006.01) | |
| F02D 19/00 | (2006.01) | |

(52) U.S. Cl.
CPC ......... *F02D 13/02* (2013.01); *F02D 13/0203* (2013.01); *F02D 19/00* (2013.01); *F02D 19/02* (2013.01); *F02D 19/0647* (2013.01); *F02D 19/0673* (2013.01); *F02D 41/0002* (2013.01); *F02D 41/0027* (2013.01); *F02D 19/027* (2013.01); *F02D 19/0678* (2013.01); *F02D 41/0007* (2013.01); *F02D 2041/001* (2013.01); *F02D 2200/0406* (2013.01); *Y02T 10/125* (2013.01); *Y02T 10/18* (2013.01); *Y02T 10/32* (2013.01); *Y02T 10/36* (2013.01); *Y02T 10/42* (2013.01)

(58) Field of Classification Search
CPC ............. F02D 19/1038; F02D 19/1052; F02D 19/108; F02D 19/1085; F02D 41/0002; F02D 41/0027; F02D 2041/001; F02D 43/00; F02D 43/04; F02D 43/12
See application file for complete search history.

(56) References Cited

U.S. PATENT DOCUMENTS

| | | | | |
|---|---|---|---|---|
| 4,638,777 | A * | 1/1987 | Fanner | F02B 19/1019 123/277 |
| 5,081,969 | A * | 1/1992 | Long, III | F02B 19/1028 123/274 |
| 5,947,076 | A | 9/1999 | Srinivasan et al. | |
| 6,298,825 | B1 * | 10/2001 | Hupperich | F02D 19/00 123/145 A |
| 8,983,755 | B2 | 3/2015 | Imamura et al. | |
| 9,670,828 | B2 | 6/2017 | Ernst et al. | |
| 2005/0072399 | A1 * | 4/2005 | Kojic | F02B 5/00 123/254 |
| 2005/0072400 | A1 * | 4/2005 | Kojic | F02B 1/12 123/256 |
| 2006/0037567 | A1 * | 2/2006 | Thomas | F02B 19/12 123/56.7 |
| 2010/0043744 | A1 * | 2/2010 | Suzuki | F02B 77/08 123/260 |
| 2011/0214649 | A1 * | 9/2011 | Imamura | F02B 19/108 123/673 |
| 2011/0224889 | A1 * | 9/2011 | Imamura | F02B 19/108 701/111 |
| 2011/0308495 | A1 * | 12/2011 | Furukawa | F02B 19/108 123/253 |
| 2012/0310510 | A1 * | 12/2012 | Imamura | F02D 41/0027 701/104 |
| 2014/0052362 | A1 * | 2/2014 | Barth | F02D 41/008 701/104 |
| 2014/0052363 | A1 * | 2/2014 | Barth | F02D 19/024 701/111 |
| 2014/0224208 | A1 * | 8/2014 | Gruber | F02B 19/10 123/260 |
| 2015/0233280 | A1 * | 8/2015 | Ernst | F02B 19/108 60/605.1 |
| 2015/0267631 | A1 * | 9/2015 | Miyamoto | F02D 41/3094 123/445 |
| 2016/0177854 | A1 * | 6/2016 | Gruber | F02D 19/0642 123/254 |
| 2016/0215683 | A1 * | 7/2016 | Graus | F02B 19/10 |

FOREIGN PATENT DOCUMENTS

| | | | | |
|---|---|---|---|---|
| DE | 10 2004 016260 A1 | | 10/2005 | |
| DE | 102004016260 A1 | * | 10/2005 | ............. F02B 43/04 |
| DE | 10 2012 021 778 A1 | | 5/2014 | |
| EP | 2067954 A1 | * | 6/2009 | ......... F02B 19/1052 |
| FR | 2 804 475 A1 | | 8/2001 | |
| JP | H08-121256 A | | 5/1996 | |
| JP | 2003286848 A | | 10/2003 | |
| JP | 2006-170142 A | | 6/2006 | |
| JP | 2006170142 A | * | 6/2006 | |
| JP | 2006170212 A | * | 6/2006 | |
| JP | 2007198140 A | * | 8/2007 | |
| JP | 2007270782 A | | 10/2007 | |
| JP | 2008248727 A | | 10/2008 | |
| JP | 2009203952 A | * | 9/2009 | |
| JP | 2009299592 A | * | 12/2009 | |
| JP | 2010209908 A | * | 9/2010 | ......... F02M 21/0239 |
| JP | 2013209967 A | * | 10/2013 | |
| JP | WO 2014049646 A1 | * | 4/2014 | ............. F02B 19/12 |
| WO | 01/55568 A2 | | 8/2001 | |
| WO | 2014072040 A1 | | 5/2014 | |

OTHER PUBLICATIONS

International Search Report and Written Opinion issued in connection with corresponding PCT Application No. PCT/AT2016/050232 dated Oct. 14, 2016.
International Preliminary Report on Patentabilty issued in connection with corresponding PCT Application No. PCT/AT2016/050232 dated Jan. 2, 2018.
Chinese Office Action for CN Application No. 201680039040.4 dated Apr. 16, 2020; 13 pgs.

* cited by examiner

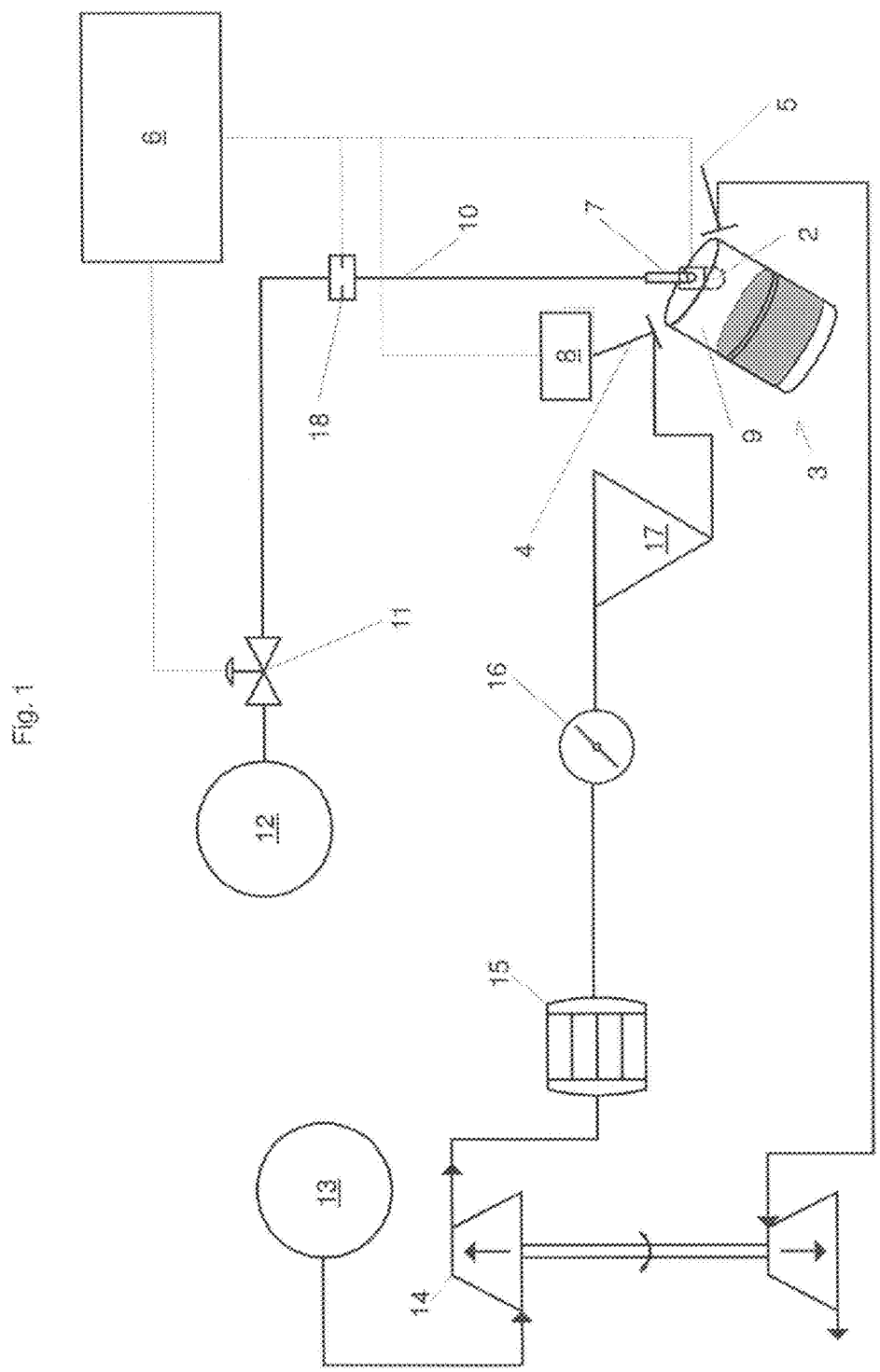

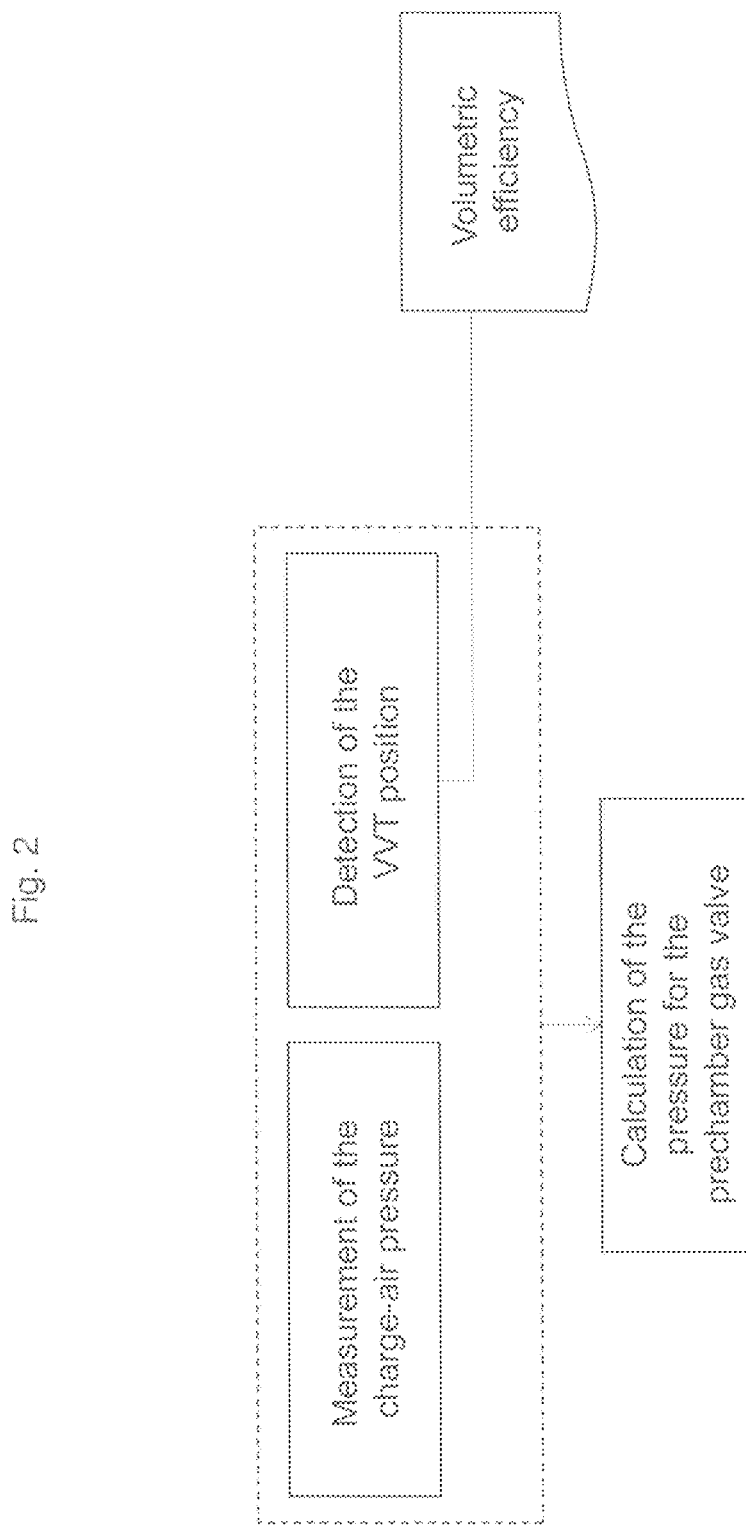

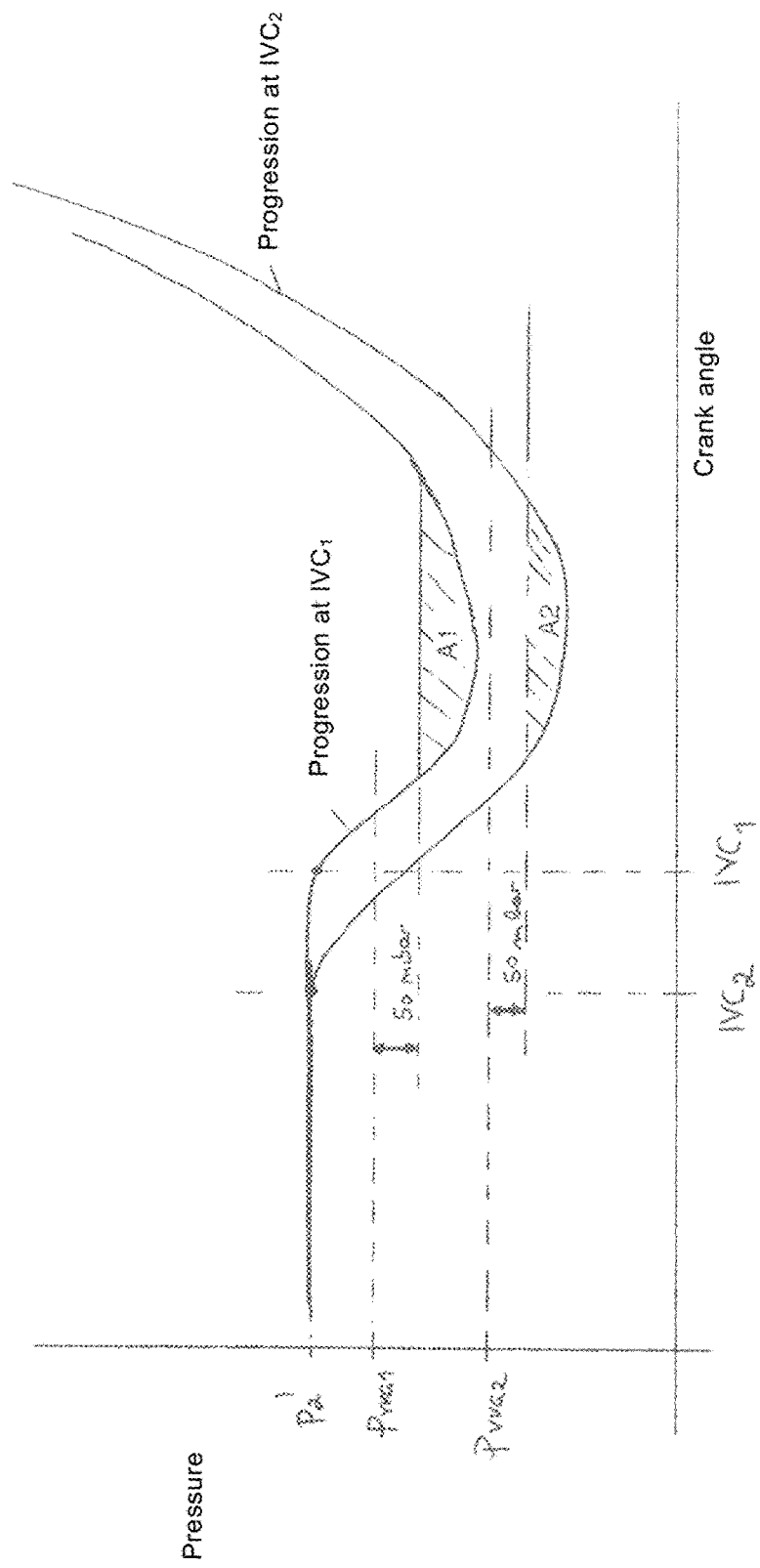

METHOD FOR REGULATING AN INTERNAL COMBUSTION ENGINE

TECHNOLOGY FIELD

This invention relates to a method for regulating an internal combustion engine. The invention also relates to an internal combustion engine with the features of the preamble of claim 8.

BACKGROUND

DE 10 2012 021 778 A1 describes a method in which inequalities between different piston-cylinder units of an internal combustion engine are detected by cylinder pressure sensors and compensated for by adjusting the quantities of propellant gas introduced into the respective prechambers. If a cylinder of a piston-cylinder unit has too low a volumetric efficiency, the quantity of propellant gas supplied to the corresponding prechamber is increased ("overblowing" of the prechambers). It is therefore a measure to compensate for differences in volumetric efficiency between different piston-cylinder units. The prechamber is used to support the combustion in the main combustion chamber of the corresponding piston-cylinder unit. An adjustment of the operating characteristics of an inlet and/or outlet valve of the piston-cylinder unit is not provided according to this method. The method requires cylinder pressure sensors or comparable sensors to detect a cylinder-specific or cylinder bank-specific volumetric efficiency.

It is known that an adjustment can be made to the operating characteristics of an inlet and/or outlet valve of the piston-cylinder unit via a variable valve train for the piston-cylinder unit.

In principle, such variable valve trains could also be used in generic internal combustion engines which have prechambers. However, this is not yet known from the prior art.

A problem in the use of variable valve trains in internal combustion engines with prechambers is that a variable valve train affects the metering of the prechamber gas.

As a result, the ratio between the energy supplied to the main combustion chamber and that of the prechamber changes, resulting in suboptimal combustion in the piston-cylinder unit without accompanying measures. The consequences are unfavorable efficiency, increased pollutant emissions and possibly increased thermal loads on the piston-cylinder unit.

BRIEF DESCRIPTION

The object of an embodiment of the invention is to provide a generic method and a generic internal combustion engine in which the above-described problems do not occur.

According to an embodiment of the invention, it is thus provided that the quantity of propellant gas supplied to the prechamber is adapted to an adjustment of the operating characteristics of an inlet and/or outlet valve of the piston-cylinder unit.

It can be provided that, when adjusting the operating characteristics such that the filling of the piston-cylinder unit is reduced, the quantity of propellant gas supplied to the prechamber is reduced. In this way, the ratio of the energy supplied to the main combustion chamber and the energy supplied to the prechamber can be kept constant.

For the reverse case, it can be provided that, when adjusting the operating characteristics such that the filling of the piston-cylinder unit is increased, the quantity of propellant gas supplied to the prechamber is increased. In this way, the ratio of the energy supplied to the main combustion chamber and the energy supplied to the prechamber can be kept constant.

An embodiment of the invention makes it possible, regardless of the selected operating characteristics of the inlet valves, to maintain a ratio of the quantity of energy supplied via the prechamber gas valve to the quantity of energy supplied to the piston-cylinder unit via the inlet valves at least substantially constant, such that approx. 1% of the quantity of energy is supplied via the prechamber gas valve and approx. 99% of the quantity of energy is supplied via the inlet valves.

This ensures that a mixture of charge originating from the piston-cylinder unit and propellant gas supplied via the prechamber gas valve with a desired ratio of air to propellant gas (lambda value) always forms in the prechamber. This is important, on the one hand, for emissions control, and on the other hand, to achieve safe combustion with high efficiency in the piston-cylinder unit.

This measure is performed such that the mixture in the prechamber has a lambda value of approximately 1 or 1.1 at the ignition time, whereby a lambda value of 1 corresponds to a stoichiometric ratio and a lambda value greater than 1 to a surplus of air.

It may be provided to adapt the ratio of the quantities of energy supplied to the main combustion chamber and the prechamber to changed operating characteristics of an inlet and/or outlet valve, e.g. valve control times, such that at "sharp" valve control times (valve control times with a low degree of filling of the piston-cylinder units), the energy fraction of the prechamber is slightly reduced in favor of the main combustion chamber (e.g. to less than 1%, e.g. to 0.7%, so as to remain in the above numerical example). Operating characteristics with low degree of filling of the piston-cylinder units cause a cooler charge of the piston-cylinder units. While maintaining the emission specifications, e.g. NOx, this allows operating with a richer mixture, which in turn requires a lower ignition pulse from the prechamber. Thus, it is possible in this case to further reduce the energy supplied to the prechamber and to lean down the prechamber.

An embodiment of the invention does not require feedback from the combustion and is therefore a pure feedforward-controlled control concept. A complex sensor system, e.g. cylinder pressure sensors, is not required.

In this disclosure, "propellant gas" means both pure propellant gas and a mixture of propellant gas and air. In other words, the prechamber can be flushed with pure propellant gas or with a mixture.

If an adjustment of the operating characteristics of the inlet valves is performed at a constant target power, such that the filling of the piston-cylinder unit is reduced, then a power control circuit of the internal combustion engine attempts to increase the filling of the piston-cylinder unit by increasing the charge-air pressure until the same quantity of energy is again supplied. The pressure prevailing before the prechamber gas valve usually follows the charge-air pressure or is tracked to the charge-air pressure. The quantity of propellant gas supplied to the prechamber by the prechamber gas valve depends on the pressure progression upstream of the prechamber gas valve—which tracks the charge-air pressure—and on the cylinder pressure progression of the associated piston-cylinder unit.

Since the former increases as described and the latter decreases if necessary due to the reduced temperature of the charge in the piston-cylinder unit, in the case of a change in the operating characteristics such that the filling of the piston-cylinder unit is reduced, the prechamber would be supplied with too large a quantity of propellant gas.

A control device intervenes and adapts, e.g. via the pressure prevailing upstream of the prechamber gas valve, the quantity of propellant gas supplied to the prechamber such that the quantity is reduced. The same applies mutatis mutandis in the case of an increase in the filling of the piston-cylinder unit.

An adjustment of the operating characteristics can e.g. be such that, by means of a variable valve train, the opening duration of the corresponding valve and/or the opening or closing time of the corresponding valve and/or the valve lift curve (in a fully variable valve train) are changed. Simple variable valve trains can be designed according to the prior art such that two discrete valve lift curves for the valve can be activated selectively by two different camshaft profiles.

One possibility of influencing the quantity of propellant gas supplied via the prechamber gas valve is via an active prechamber gas valve. An active prechamber gas valve, in contrast to a passive valve which is activated only by a differential pressure, allows an adjustment of the opening duration regardless of the pressure applied to the prechamber gas valve.

An alternative possibility is to use an active aperture arranged upstream of a passive prechamber gas valve. An active aperture has an adjustable free cross-sectional area (setting of an opening degree). The quantity of propellant gas supplied to the prechamber can thus be varied with unchanged differential pressure between the charge-air pressure and the prechamber gas supply pressure upstream of the active aperture.

Alternatively or in addition to these two measures, the pressure applied before the prechamber gas valve pressure can of course be changed by means of an actively influenceable pressure regulator to keep the differential pressure constant via the prechamber gas valve, whereby the desired adjustment of the prechamber gas quantity is achieved.

If, at constant charge-air pressure, e.g. the pressure in the main combustion chamber increases due to a change in the operating characteristics of the inlet valves towards a higher filling of the main combustion chamber, then the pressure applied to the prechamber gas valve must be increased accordingly to adjust the differential pressure via the prechamber gas valve, such that the ratio of the quantity of energy supplied via the prechamber gas valve and the quantities of energy supplied through the inlet valves remains constant. In other words, the changed volumetric efficiency is taken into account here.

An even more accurate adjustment of the quantity of propellant gas supplied to the prechamber can be achieved by additionally taking account of the charge-air pressure such that, at a higher charge-air pressure, the difference between the pressure upstream of the prechamber gas valve and the pressure in the main combustion chamber is not kept constant, but rather the difference is increased by increasing the pressure upstream of the prechamber gas valve. The purpose of this measure is to keep the ratio of the energy supplied via the prechamber gas valve and the energy in the main combustion chamber constant.

The volumetric efficiency and the density of the mixture (and thus the mass in the cylinder) are also influenced by a changed mixture temperature. It can therefore be provided to use the above-described measure to compensate for a changed mixture temperature.

When using an active prechamber gas valve as described above, an opening time of the prechamber gas valve can be increased or decreased, and an adjustment of the pressure prevailing upstream of the prechamber gas valve is not necessarily required. However, a higher charge-air pressure can of course also take into account here with an appropriate opening time of the prechamber gas valve.

The control device described here can be designed as a control circuit of a regulating device of the internal combustion engine.

More particularly, the internal combustion engine has a plurality of piston-cylinder units, each being assigned its own prechambers, whereby the control device proceeds in relation to each pair of piston-cylinder units and prechambers according to one of the embodiments described above.

To change the operating characteristics of at least one inlet valve and/or outlet valve, the internal combustion engine has a variable valve train (or VVT for short).

More particularly, the internal combustion engine is designed as a stationary gas engine, in particular coupled or able to be coupled to a generator for generating electricity.

BRIEF DESCRIPTION OF THE DRAWINGS

The invention is discussed with reference to the figures. The figures show the following:

FIG. 1 shows a schematic representation of an internal combustion engine

FIG. 2 a control diagram according to an exemplary embodiment of the invention

FIG. 3 a diagram of the gas pressure applied to the prechamber gas valve

DETAILED DESCRIPTION

FIG. 1 shows an internal combustion engine 1 with a plurality of piston-cylinder units 3 (only one of which is shown in the example). The piston-cylinder unit 3 is supplied with propellant gas via inlet valves 4 (only one of which is shown). Exhaust gases are discharged via outlet valves 5 (only one of which is shown). Furthermore, a prechamber 2 is provided, which communicates via overflow openings with a main combustion chamber 9 of the piston-cylinder unit. The prechamber 2 is supplied with propellant gas (either pure propellant gas or a mixture) via a prechamber gas valve 7 which is designed here to be active.

In this exemplary embodiment, the operating characteristics of the inlet valves 4 can be varied via a variable valve train 8. Not shown is a fundamentally also (alternatively or additionally) possible variation of the operating characteristics of the outlet valves 5. The variable valve train 8 has a signal connection to a control device 6 of the internal combustion engine 1 and is controlled by the latter. The prechamber gas valve 7 that is also active in this case has a signal connection to the control device 6 and is controlled by the latter.

In the prechamber gas supply 10, a pressure regulator 11 is arranged, which has a signal connection to the control device 6 and is controlled by the latter. This creates the possibility of varying the pressure applied to the prechamber gas valve 7. Propellant gas is supplied to the prechamber 2 from a propellant gas source for the prechamber 12 via the prechamber gas supply 10, the pressure regulator 11 and the prechamber gas valve 7.

Propellant gas is supplied to the main combustion chamber 9 from a propellant gas source for the main combustion chamber 13, a compressor 14, a mixture cooler 15, a throttle 16, an inlet duct 17 and the inlet valves 4.

The quantity of propellant gas supplied to the main combustion chamber 9 can be changed via the variable valve train 8. The quantity of propellant gas supplied to the prechamber 2 can be adjusted via the prechamber gas valve 7 and/or the pressure regulator 11 and/or the variable aperture 18.

FIG. 2 shows a control diagram according to a first exemplary embodiment of the invention, in which, in a first step, the charge-air pressure p2' prevailing in the inlet duct 17 and applied to the inlet valve 4 is measured. From the operating characteristics of the variable valve train 8 (in the diagram: "Detection of the VVT position"), a volumetric efficiency is determined by the control device 6. From the charge-air pressure p2' and the volumetric efficiency, the pressure is calculated which is required for the metering of the corresponding quantity of propellant gas for the prechamber 2.

FIG. 3 shows a diagram of the pressure in the main combustion chamber 9 (cylinder pressure) in the inlet stroke for two different operating characteristics IVC1 and IVC2 (inlet valve closing) of an inlet valve 4 plotted against the crank angle.

Also shown are two different pressure levels pVKG1 and pVKG2 of the pressure applied in the prechamber gas supply 10 upstream of the prechamber gas valve 7. The level of this pressure applied in the prechamber gas supply 10 upstream of the prechamber gas valve 7 can be changed by operating the pressure regulator 11.

The significant factor for the actual quantity of propellant gas supplied to the prechamber 2 is the differential pressure prevailing over the prechamber gas valve 7 between the cylinder pressure and the pressure (pVKG1 or pVKG2) in the prechamber gas supply 10 upstream of the prechamber gas valve 7.

Frequently, prechamber gas valves 7 are designed as passive valves (also called check valves), which open at a certain positive differential pressure and thus allow propellant gas to enter the prechamber 2. "Positive" differential pressure means that the pressure upstream of the prechamber gas valve 7 is greater than in the prechamber 2 and in the main combustion chamber 9. A common value (as chosen for this example) of a differential pressure required to open a passive prechamber gas valve is 50 mbar.

If an inlet valve is moved to earlier closing in the inlet phase (i.e. the inlet valve 4 closes at a larger crank angle before the bottom dead center in the representation of IVC1 to IVC2), the cylinder pressure decreases starting from the charge-air pressure p2' in the main combustion chamber 9 (progression at IVC2) than in the case of a later closing of the inlet valve (progression at IVC1). This normally results in the fact that The period in which the differential pressure upstream of the prechamber gas valve 7 and prechamber 2 is greater than or equal to the differential pressure required to operate the prechamber gas valve 7 is extended compared to a later closing of the inlet valve. As a result, more propellant gas enters the prechamber 2.

According to an embodiment of the invention, the changed quantity of propellant gas supplied to the prechamber 2 due to the changed operating characteristics of an inlet or outlet valve can now be compensated for. In this exemplary embodiment, the compensation is performed by lowering the pressure level pVKG1 to pVKG2 in the prechamber gas supply 10 upstream of the prechamber gas valve 7 by operating the pressure regulator 11.

The hatched area A1 corresponds to the quantity of prechamber gas in the pressure progression at IVC1 and the pressure level pVKG1. The hatched area A2 corresponds to the quantity of prechamber gas in the pressure progression at IVC2 and the pressure level pVKG2. By means of an embodiment of the invention, the quantity A2 can be equalized with the quantity A1.

Due to the reduced pressure level, the ratio of the energy supplied via the prechamber gas valve 7 and the energy supplied via the inlet valves 4 is kept constant or even reduced, if desired. If the pressure level pVKG1 were maintained in the operating characteristic IVC2, this would result in an excessively high quantity of prechamber gas.

Alternatively or additionally, it can be provided that the pressure level upstream of the prechamber gas valve 7 is adjusted by an aperture 18. In this case, the quantity of propellant gas supplied to the prechamber 2 can be varied with unchanged differential pressure between the outlet of the pressure regulator 11 and the prechamber 2. This requires an active aperture 18. This has a signal connection to the control device 6.

In the presence of an active (i.e. controllable) prechamber gas valve 7, the ratio of the energy supplied via the prechamber gas valve 7 and the energy supplied via the inlet valves 4 can be kept constant by changing the opening duration of the prechamber gas valve 7.

The invention claimed is:

1. A method for controlling an internal combustion engine comprising:
    providing a piston-cylinder unit with a main combustion chamber and a prechamber;
    adjusting a quantity of a first propellant gas supplied to the prechamber to vary a first energy in the prechamber;
    adjusting, via a variable valve train, operating characteristics of an inlet valve and/or an outlet valve to cause adjusting of a quantity of a second propellant gas in the main combustion chamber to vary a second energy in the main combustion chamber, wherein adjusting the quantity of the second propellant gas comprises decreasing or increasing the quantity of the second propellant gas in the main combustion chamber; and
    controlling a ratio between the first energy in the prechamber and the second energy in the main combustion chamber, based on a target ratio of the first energy to the second energy, wherein controlling the ratio comprises:
    compensating for the decreasing of the quantity of the second propellant gas in the main combustion chamber caused by the variable valve train, by decreasing the quantity of the first propellant gas supplied to the prechamber based on the target ratio; and
    compensating for the increasing of the quantity of the second propellant gas in the main combustion chamber caused by the variable valve train, by increasing the quantity of the first propellant gas supplied to the prechamber based on the target ratio.

2. The method according to claim 1, wherein controlling the ratio between the first energy in the prechamber and the second energy in the main combustion chamber, comprises substantially maintaining the ratio at the target ratio.

3. The method according to claim 1, wherein controlling the ratio between the first energy in the prechamber and the second energy in the main combustion chamber, comprises reducing the first energy relative to the second energy to reduce the ratio based on the target ratio.

4. The method according to claim 1, wherein adjusting the quantity of the first propellant gas supplied to the prechamber includes adjusting a charge-air pressure of the internal combustion engine.

5. The method according to claim 1, wherein adjusting the quantity of the first propellant gas supplied to the prechamber comprises adjusting the quantity via an adjustment of an active prechamber gas valve by setting an opening duration of the active prechamber gas valve.

6. The method according to claim 1, wherein adjusting the quantity of the first propellant gas supplied to the prechamber comprises adjusting the quantity via an adjustment of an active aperture by setting an opening degree of the active aperture.

7. The method according to claim 1, wherein adjusting the quantity of the first propellant gas supplied to the prechamber comprises adjusting the quantity via an adjustment of an actively influenceable pressure regulator by setting a pressure applied to a passive prechamber gas valve by the actively influenceable pressure regulator.

8. An internal combustion engine, comprising:
a piston-cylinder unit comprising a main combustion chamber, an inlet valve, an outlet valve, and a prechamber;
a gas supply configured to adjust a quantity of a first propellant gas supplied to the prechamber to vary a first energy in the prechamber;
a variable valve train configured to adjust operating characteristics of the inlet valve and/or the outlet valve to cause an adjustment of a quantity of a second propellant gas in the main combustion chamber to vary a second energy in the main combustion chamber, wherein the adjustment of the quantity of the second propellant gas comprises an increase or a decrease in the quantity of the second propellant gas in the main combustion chamber; and
a controller configured to control a ratio between the first energy in the prechamber and the second energy in the main combustion chamber, based on a target ratio of the first energy to the second energy, wherein the controller is configured to control the ratio by:
compensating for the decrease in the quantity of the second propellant gas in the main combustion chamber caused by the variable valve train, by decreasing the quantity of the first propellant gas supplied to the prechamber based on the target ratio; and
compensating for the increase in the quantity of the second propellant gas in the main combustion chamber caused by the variable valve train, by increasing the quantity of the first propellant gas supplied to the prechamber based on the target ratio.

9. The internal combustion engine of claim 8, wherein the controller is configured to control the ratio to substantially maintain the ratio at the target ratio.

10. The internal combustion engine of claim 8, wherein the controller is configured to control the ratio to be reduced by reducing the first energy relative to the second energy based on the target ratio.

11. The internal combustion engine of claim 8, wherein the gas supply comprises a passive prechamber gas valve.

12. The internal combustion engine of claim 8, wherein the gas supply comprises an active prechamber gas valve, an active aperture upstream of a passive prechamber gas valve, or an actively influenceable pressure regulator.

13. A system, comprising:
a controller configured to control a ratio between a first energy of a first propellant gas in a prechamber and a second energy of a second propellant gas in a main combustion chamber of a piston-cylinder assembly, based on a target ratio of the first energy to the second energy, wherein controlling the ratio comprises:
compensating for a decrease of the second energy of the second propellant gas in the main combustion chamber caused by a variable valve train, by decreasing the first energy of the first propellant gas in the prechamber based on the target ratio; and
compensating for an increase of the second energy of the second propellant gas in the main combustion chamber caused by the variable valve train, by increasing the first energy of the first propellant gas in the prechamber based on the target ratio.

14. The system of claim 13, wherein the controller is configured to control the ratio to substantially maintain the ratio at the target ratio.

15. The system of claim 13, wherein the controller is configured to control the first energy in the prechamber by controlling a quantity of the first propellant gas supplied to the prechamber, wherein the controller is configured to control the second energy in the main combustion chamber by controlling operating characteristics of the inlet valve and/or the outlet valve of the piston-cylinder assembly by the variable valve train to cause an adjustment of a quantity of the second propellant gas in the main combustion chamber.

16. The system of claim 13, wherein the controller is configured to control the ratio based on the target ratio, by controlling the quantity of the first propellant gas supplied to the prechamber via one of:
an adjustment of an active prechamber gas valve;
an adjustment of an actively influenceable pressure regulator; or
an adjustment of an active aperture upstream of a passive prechamber gas valve.

17. The system of claim 13, wherein the controller is configured to control the ratio to be reduced by reducing the first energy relative to the second energy based on the target ratio.

18. The system of claim 13, wherein the controller is configured to control the ratio based on the target ratio, by at least:
measuring a pressure associated with the second propellant gas;
detecting a position of the variable valve train;
determining a volumetric efficiency based on the position of the variable valve train; and
calculating a parameter to adjust the first propellant gas in the prechamber based on the pressure and the volumetric efficiency.

19. The system of claim 13, comprising the piston-cylinder assembly, a gas supply configured to supply the first propellant gas to the prechamber, the variable valve train, or a combination thereof.

20. The system of claim 13, comprising an internal combustion engine having the controller.

* * * * *